(12) United States Patent
Takagi et al.

(10) Patent No.: US 11,824,180 B2
(45) Date of Patent: Nov. 21, 2023

(54) VEHICLE

(71) Applicant: SUBARU CORPORATION, Tokyo (JP)

(72) Inventors: Yasushi Takagi, Tokyo (JP); Toshiaki Naruke, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 43 days.

(21) Appl. No.: 17/443,838

(22) Filed: Jul. 28, 2021

(65) Prior Publication Data

US 2022/0059887 A1 Feb. 24, 2022

(30) Foreign Application Priority Data

Aug. 20, 2020 (JP) .................. 2020-139345

(51) Int. Cl.
| | |
|---|---|
| *H01M 10/663* | (2014.01) |
| *H01M 10/625* | (2014.01) |
| *H01M 10/635* | (2014.01) |
| *H01M 10/48* | (2006.01) |
| *B60L 58/26* | (2019.01) |
| *B60H 1/00* | (2006.01) |

(52) U.S. Cl.
CPC ...... *H01M 10/663* (2015.04); *B60H 1/00278* (2013.01); *B60L 58/26* (2019.02); *H01M 10/48* (2013.01); *H01M 10/625* (2015.04); *H01M 10/635* (2015.04); *B60H 1/00785* (2013.01); *H01M 2220/20* (2013.01)

(58) Field of Classification Search
CPC ............. H01M 10/663; H01M 10/625; H01M 10/635; H01M 10/48; H01M 2220/20; B60L 58/26; B60H 1/00278; B60H 1/00785

See application file for complete search history.

(56) References Cited

U.S. PATENT DOCUMENTS

| | | | |
|---|---|---|---|
| 2014/0023905 A1* | 1/2014 | Taniyama | H01M 10/482 429/120 |
| 2015/0380785 A1* | 12/2015 | Takeuchi | B60L 1/02 429/62 |
| 2018/0048032 A1* | 2/2018 | Takatsuka | H01M 10/48 |
| 2019/0033164 A1* | 1/2019 | Ing | G01M 3/3236 |

FOREIGN PATENT DOCUMENTS

JP         2014-37910 A     2/2014

* cited by examiner

*Primary Examiner* — James Lee
(74) *Attorney, Agent, or Firm* — TROUTMAN PEPPER HAMILTON SANDERS LLP (57) ABSTRACT

A vehicle includes a battery pack, an air conditioning system, a communication member, a pack humidity detector, an outside air humidity detector, and a controller. The battery pack contains a battery module. The air conditioning system is configured to regulate humidity of air and send the air. The communication member fluidly connects a blowing port of the air conditioning system and an inside of the battery pack. The pack humidity detector is configured to detect humidity in the inside of the battery pack. The outside air humidity detector is configured to detect humidity of an outside air. The controller is configured to control the air conditioning system so that the humidity in the battery pack is equal to or lower than the humidity of the outside air.

9 Claims, 9 Drawing Sheets

VEHICLE

CROSS-REFERENCE TO RELATED APPLICATIONS

The present application claims priority from Japanese Patent Application No. 2020-139345 filed on Aug. 20, 2020, the entire contents of which are hereby incorporated by reference.

BACKGROUND

The disclosure relates to a vehicle.

For example, Japanese Unexamined Patent Application Publication No. 2014-37910 discloses a vehicle that has a battery pack containing a battery module.

SUMMARY

An aspect of the disclosure provides a vehicle including a battery pack, an air conditioning system, a communication member, a pack humidity detector, an outside air humidity detector, and a controller. The battery pack houses a battery module. The air conditioning system is configured to regulate humidity of air and send the air. The communication member fluidly connects a blowing port of the air conditioning system and an inside of the battery pack. The pack humidity detector is configured to detect humidity in the inside of the battery pack. The outside air humidity detector is configured to detect humidity of outside air. The controller is configured to control the air conditioning system such that the humidity in the battery pack is equal to or lower than the humidity of the outside air.

An aspect of the disclosure provides a vehicle including a battery pack, an air conditioning system, a communication member, a pressure regulator, a pack pressure detector, an outside air pressure detector, and a controller. The battery pack houses a battery module. The air conditioning system is configured to send air. The communication member fluidly connects a blowing port of the air conditioning system and an inside of the battery pack. The pressure regulator is provided in an air ventilation passage defined by the communication member. The pressure regulator is configured to change pressure of air that passes through the communication member. The pack pressure detector is configured to detect pressure in the battery pack. The outside air pressure detector is configured to detect pressure of outside air. The controller is configured to control the air conditioning system and the pressure regulator such that the pressure in the battery pack is equal to the pressure of the outside air.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

A battery pack may be air-tightly sealed for the purpose of protection of a battery module. In this condition, the state of air, such as temperature, humidity, or pressure, may differ between the inside air and the outside air of the battery pack, in some cases. For example, a certain difference in humidity between the inside air and the outside air of the battery pack can cause water condensation in the battery pack. The condensed water may reduce insulation resistance of the battery module, which may result in short circuit of a circuit. In this manner, a certain difference in the state between the inside air and the outside air of the battery pack can consequently accelerate damage and deterioration of the battery module and the battery pack.

In view of this, it is desirable to provide a vehicle configured to regulate the state of air in a battery pack.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
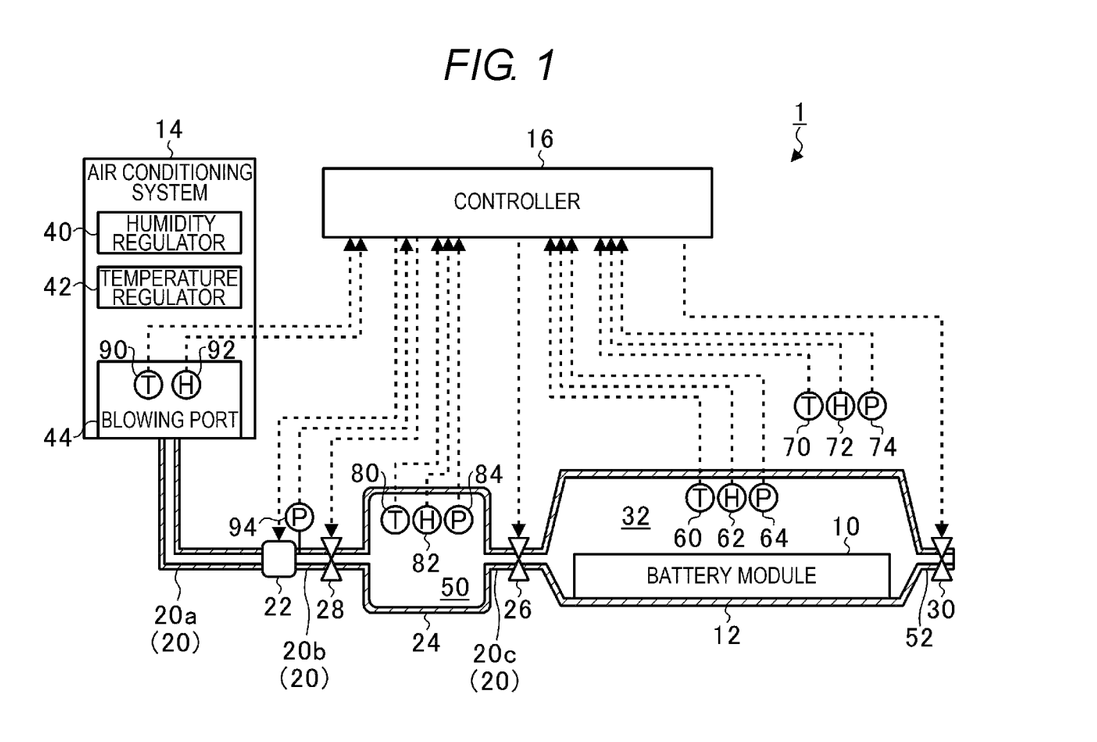
FIG. 1 is a schematic diagram illustrating a configuration of a vehicle according to an embodiment of the disclosure.

FIG. 1 is a schematic diagram illustrating a configuration of a vehicle 1 according to an embodiment of the disclosure. The vehicle 1 is, for example, an electric vehicle or a hybrid vehicle. The vehicle 1 includes a battery module 10, a battery pack 12, an air conditioning system 14, a controller 16, communication members 20a, 20b, and 20c, a pressure regulator 22, a control chamber 24, a first valve 26, a second valve 28, and a third valve 30. Hereinafter, the communication members 20a, 20b, and 20c may be collectively referred to as "communication members 20".

The battery module 10 is, for example, a secondary battery, such as a lithium ion battery. The battery module 10 supplies power to a motor via an inverter and other elements, although these elements are not illustrated in the drawing. In addition, the battery module 10 is able to be charged with power, such as regenerative power of the motor or power supplied from the outside.

The battery pack 12 is formed into, for example, a hollow flat box shape. The battery module 10 is contained in the battery pack 12. The battery pack 12 has a pack inside space 32 in which air passes through under the presence of the battery module 10. The pack inside space 32 corresponds to a space between an inside surface of the battery pack 12 and the battery module 10.

The air conditioning system 14 regulates humidity and temperature of air and sends the air. In one example, the air conditioning system 14 includes a humidity regulator 40, a temperature regulator 42, and a blowing port 44.

The humidity regulator 40 intakes air in the vehicle or outside air. The humidity regulator 40 regulates humidity of the intake air under control of the controller 16. The temperature regulator 42 regulates temperature of the humidity-regulated air, under control of the controller 16. The temperature regulator 42 sends the temperature-regulated air from the blowing port 44. Thus, the air in which the temperature and the humidity have been regulated, is sent out from the blowing port 44.

The communication members 20 are formed into tube shapes. The communication member 20a has an end coupled to the blowing port 44 and has the other end coupled to an inlet of the pressure regulator 22. The communication member 20b has an end coupled to an outlet of the pressure regulator 22 and has the other end coupled to the control chamber 24. The communication member 20c has an end coupled to the control chamber 24 and has the other end coupled to a side surface of the battery pack 12.

That is, the communication members 20 fluidly connects the blowing port 44 of the air conditioning system 14 and the inside of the battery pack 12 via the pressure regulator 22 and the control chamber 24. With this structure, the air that is sent out from the blowing port 44 passes through the communication members 20 into the battery pack 12 via the pressure regulator 22 and the control chamber 24.

The pressure regulator 22 is provided between the blowing port 44 of the air conditioning system 14 and the control chamber 24, in an air ventilation passage defined by the communication members 20. The pressure regulator 22 is, for example, a compressor. The pressure regulator 22 changes pressure of the air entering from the communication member 20a and then sends out this air to the communication member 20b.

The control chamber 24 is formed into, for example, a hollow box shape. The control chamber 24 is positioned at an intermediate part of the air ventilation passage through the communication members 20, for example, between the pressure regulator 22 and the battery pack 12. The control chamber 24 has a control chamber inside space 50 in which an air ventilation cross sectional area is larger than those of the communication members 20.

The control chamber 24 is provided, for example, in such a manner that the volume of the control chamber inside space 50 and the volume of the pack inside space 32 are equal to each other. The volume of the control chamber inside space 50 represents the volume of a space for containing the air in the control chamber 24. The volume of the pack inside space 32 represents the volume of a space for containing the air in the battery pack 12. Note that the control chamber 24 may not be limited to the structure in which the volume of the control chamber inside space 50 and the volume of the pack inside space 32 are equal to each other. The volume of the control chamber inside space 50 may be, for example, one-half or one-third of the volume of the pack inside space 32. That is, the control chamber 24 may be provided in such a manner that the volume of the control chamber inside space 50 and the volume of the pack inside space 32 have a predetermined relationship.

The first valve 26 is provided to the communication member 20c that fluidly connects the control chamber 24 and the battery pack 12. The first valve 26 switches opening and closing of the passage of the communication member 20c. The second valve 28 is provided to the communication member 20b that fluidly connects the pressure regulator 22 and the control chamber 24. The second valve 28 switches opening and closing of the passage of the communication member 20b.

The battery pack 12 includes an outlet 52 that fluidly connects the pack inside space 32 and the outside space. The outlet 52 is formed, for example, at a side surface on a side opposite to the side surface that is coupled to the communication member 20c of the battery pack 12. A seal member may be provided between the battery pack 12 and the communication member 20c, between the battery pack 12 and the outlet 52, or at other position, in order to improve airtightness of the battery pack 12. The third valve 30 is provided to the outlet 52. The third valve 30 switches opening and closing of the outlet 52.

The third valve 30 in the opened state directly couples the pack inside space 32 with the outside space. The first valve 26 and the third valve 30 both in the closed state air-tightly close the pack inside space 32. The first valve 26 in the opened state directly couples the pack inside space 32 to the control chamber inside space 50 through the communication member 20c. The first valve 26 and the second valve 28 both in the closed state air-tightly close the control chamber inside space 50. The second valve 28 in the opened state directly couples the control chamber inside space 50 to the pressure regulator 22 through the communication member 20b.

A pack temperature detector 60, a pack humidity detector 62, and a pack pressure detector 64 are provided in the battery pack 12. The pack temperature detector 60 detects pack temperature, which shows temperature of the air in the battery pack 12. The pack humidity detector 62 detects pack humidity, which shows humidity of the air in the battery pack 12. The pack pressure detector 64 detects pack pressure, which shows pressure of the air in the battery pack 12.

An outside air temperature detector 70, an outside air humidity detector 72, and an outside air pressure detector 74 are provided to the vehicle 1, on the outside of the battery pack 12. The outside air temperature detector 70 detects outside air temperature. The outside air humidity detector 72 detects outside air humidity. The outside air pressure detector 74 detects outside air pressure.

A control chamber temperature detector 80, a control chamber humidity detector 82, and a control chamber pressure detector 84 are provided in the control chamber 24. The control chamber temperature detector 80 detects control chamber temperature, which shows temperature of the air in the control chamber 24. The control chamber humidity detector 82 detects control chamber humidity, which shows humidity of the air in the control chamber 24. The control chamber pressure detector 84 detects control chamber pressure, which shows pressure of the air in the control chamber 24.

A sending air temperature detector 90 and a sending air humidity detector 92 are provided to the blowing port 44 of the air conditioning system 14. The sending air temperature detector 90 detects sending air temperature, which shows temperature of the air sent out from the blowing port 44. The sending air humidity detector 92 detects sending air humidity, which shows humidity of the air sent out from the blowing port 44. Note that the pack humidity, the outside air humidity, the control chamber humidity, and the sending air humidity are relative humidity.

A sending air pressure detector 94 is provided between the pressure regulator 22 and the second valve 28 at the communication member 20b. The sending air pressure detector 94 detects sending air pressure, which shows pressure of the air that is sent out from the blowing port 44 and then passes through the pressure regulator 22.

The controller 16 includes a semiconductor integrated circuit including elements such as a central processing unit, a ROM storing programs and the like, and a RAM serving as a work area. The controller 16 acquires a detection value detected by each of the detectors, for example, data showing the state of the air, such as temperature, humidity, or pressure, at each element. The controller 16 regulates the state of the air in the battery pack 12, based on these acquired detection values.

In one example in which the pack humidity is higher than the outside air humidity, water condensation may occur in the battery pack 12. The water condensation can cause reduction in insulation resistance of the battery module 10. The reduced insulation resistance may cause short circuit in a circuit, which may accelerate damage and deterioration of the battery module 10 and the battery pack 12 due to excessive heat.

From this point of view, the controller 16 controls the air conditioning system 14, the pressure regulator 22, the first valve 26, the second valve 28, and the third valve 30, so that the pack humidity will be equal to or lower than the outside air humidity. As described later, the controller 16 controls each element so that dry air will be sent from the air conditioning system 14 to the battery pack 12, whereby the inside of the battery pack 12 is dehumidified.

In another example in which a difference between the pack pressure and the outside air pressure increases, stress that is applied to the seal member of the battery pack 12 increases, which may accelerate damage and deterioration of the seal member. Damage and deterioration of the seal member may reduce airtight performance of the battery pack 12.

From this point of view, the controller 16 controls the air conditioning system 14, the pressure regulator 22, the first valve 26, the second valve 28, and the third valve 30, so that the pack pressure will be equal to the outside air pressure. As described later, in the state in which the pack pressure is lower than the outside air pressure, the controller 16 makes the air conditioning system 14 send air to the battery pack 12 to pressurize the inside of the battery pack 12. On the other hand, in the state in which the pack pressure is higher than the outside air pressure, the controller 16 makes the air in the battery pack 12 be sent out to the outside to depressurize the inside of the battery pack 12.

Figure 2:
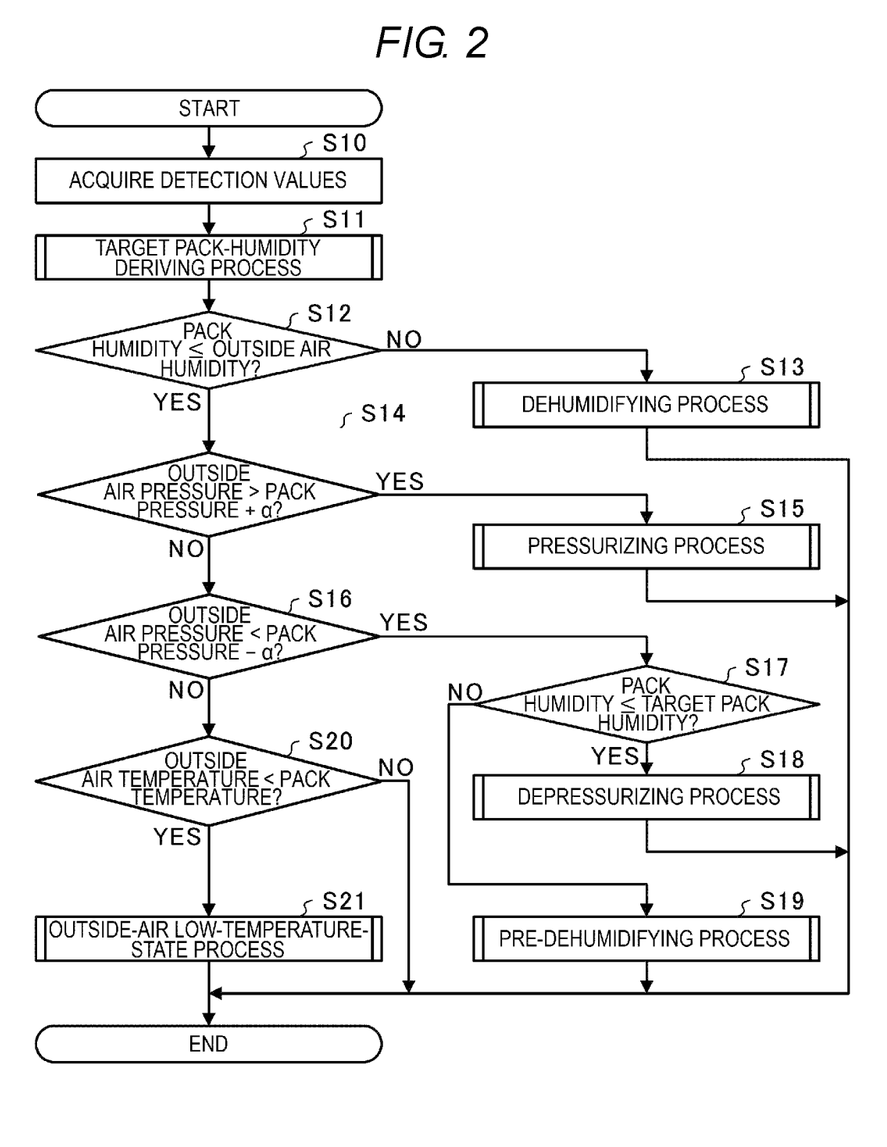
FIG. 2 is a flowchart of an overview of operation of a controller.

FIG. 2 is a flowchart of an overview of operation of the controller 16. The controller 16 performs a series of main processes illustrated in FIG. 2, each time interruption timing of the main processes comes at a predetermined control cycle.

First, the controller 16 acquires a detection value obtained by each detector (S10). In one example, the controller 16 acquires latest values of the following parameters: pack temperature, pack humidity, pack pressure, outside air temperature, outside air humidity, outside air pressure, control chamber temperature, control chamber humidity, control chamber pressure, sending air temperature, sending air humidity, and sending air pressure. The controller 16 may also acquire temperature of the battery module 10 from a detector that detects temperature of the battery module 10 itself, which the detector is not illustrated in the drawing.

Next, the controller 16 performs a target pack-humidity deriving process for deriving a target pack humidity as a target value of the pack humidity (S11). The target pack-humidity deriving process will be detailed later. Although described later, the target pack humidity is at least the outside air humidity or lower and is used for regulating the state of the air in the battery pack 12.

Then, the controller 16 determines whether the pack humidity is the outside air humidity or lower (S12). In the case in which the pack humidity exceeds the outside air humidity (NO in S12), the controller 16 performs a dehumidifying process for dehumidifying the inside of the battery pack 12 (S13). The dehumidifying process will be detailed later.

On the other hand, in the case in which the pack humidity is the outside humidity or lower (YES in S12), the controller 16 determines whether the outside air pressure is higher than the total of the pack pressure and a predetermined value a (S14). The predetermined value a, which is set in advance, is an absolute value of a margin of error by which the pack pressure can be considered to be approximately equal to the outside air pressure.

In the case in which the outside air pressure is higher than the total of the pack pressure and the predetermined value a (YES in S14), the controller 16 performs a pressurizing process for increasing the pack pressure (S15). The pressurizing process will be detailed later.

On the other hand, in the case in which the outside air pressure is equal to or lower than the total of the pack pressure and the predetermined value a (NO in S14), the controller 16 determines whether the outside air pressure is lower than a value that is obtained by subtracting the predetermined value a from the pack pressure (S16).

In the case in which the outside air pressure is lower than the value that is obtained by subtracting the predetermined value a from the pack pressure (YES in S16), the controller 16 determines whether the pack humidity is equal to or lower than the target pack humidity, which is derived in step S11 (S17).

In the case in which the pack humidity is equal to or lower than the target pack humidity (YES in S17), the controller 16 performs a depressurizing process for decreasing the pack pressure (S18). The depressurizing process will be detailed later.

In the case in which the pack humidity is higher than the target pack humidity (NO in S17), the controller 16 performs a pre-dehumidifying process for dehumidifying the inside of the battery pack 12 in advance, before decreasing the pack pressure (S19).

Decreasing the pack pressure lowers the pack temperature and may increase apparent pack humidity. If the pack pressure is decreased in the state in which the pack humidity is higher than the target pack humidity, the pack humidity after the depressurization, may become higher than the outside humidity. In view of this, the controller 16 performs the pre-dehumidifying process in advance so that the pack humidity will be equal to or lower than the target pack humidity, before performing the depressurizing process. Thus, the controller 16 prevents water condensation from occurring in the battery pack 12 even when the depressurizing process is performed at the next interruption timing of the main processes after the pre-dehumidifying process. The pre-dehumidifying process will be detailed later.

On the other hand, in the case in which the outside air pressure is equal to or higher than the value that is obtained by subtracting the predetermined value a from the pack pressure (NO in S16), the controller 16 determines whether the outside air temperature is lower than the pack temperature (S20).

In the case in which the outside air temperature is lower than the pack temperature (YES in S20), the controller 16 performs an outside-air low-temperature-state process, which is a process performed when the outside air temperature is relatively low (S21).

The air in the vicinity of the inside surface of the battery pack 12 is easily heat-exchanged with the outside air via the battery pack 12. In one example, when the outside air temperature becomes lower than the pack temperature at night or other time, the air in the vicinity of the inside surface of the battery pack 12 is cooled by the outside air, which may cause water condensation on the inside surface of the battery pack 12. From this point of view, the controller 16 performs the outside-air low-temperature-state process to lower the pack humidity low enough to prevent water condensation even when the air in the battery pack 12 is cooled by the outside air. Thus, the controller 16 prevents water condensation in the battery pack 12 even when the outside air temperature becomes low. The outside-air low-temperature-state process will be detailed later.

In the case in which the outside air temperature is equal to or higher than the pack temperature (NO in S20), the controller 16 terminates the series of the processes and waits for the next interruption timing of the main processes. In this state, the air in the battery pack 12 is maintained such that the pack humidity is equal to or lower than the outside air humidity and that the pack pressure is approximately equal to the outside air pressure.

Figure 3:
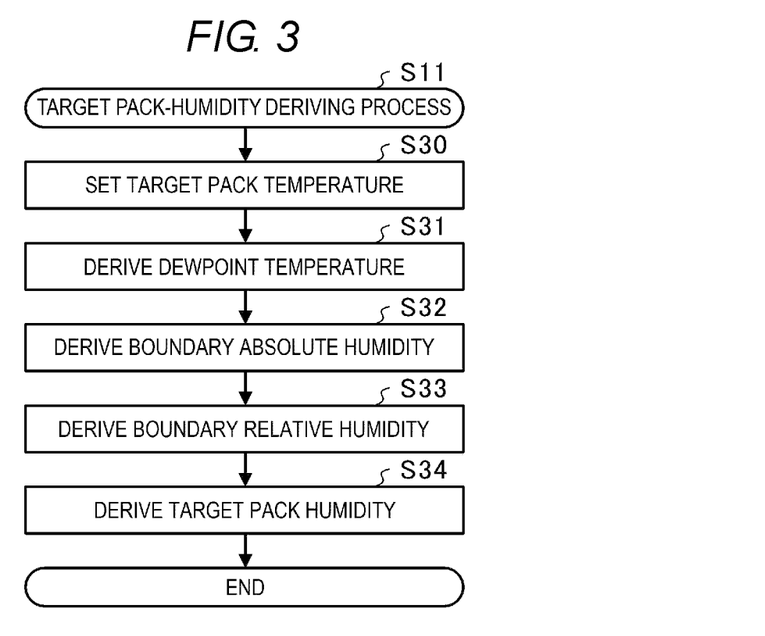
FIG. 3 is a flowchart of a target pack-humidity deriving process.

FIG. 3 is a flowchart of the target pack-humidity deriving process (S11). In the target pack-humidity deriving process, the controller 16 derives a pack humidity that does not cause condensation of water vapor in the air in the battery pack 12 even when the temperature of the air in the battery pack 12 becomes approximately equal to the outside air temperature, as the target pack humidity.

First, the controller 16 sets a target value of the pack temperature as a target pack temperature (S30). For example, the controller 16 sets the target pack temperature based on the temperature of the battery module 10 and the operation temperature range of the battery module 10. The operation temperature range of the battery module 10 is, for example, 20 to 40° C., but a specific value can be freely set depending on the type of the battery module 10 or the like. The controller 16 may set the current temperature of the battery module 10 that is in the operation temperature range, as the target pack temperature. Otherwise, in the case in which the current temperature of the battery module 10 exceeds an upper limit of the operation temperature range or is below a lower limit of the operation temperature range, the controller 16 may set a middle value in the operation temperature range or the like, as the target pack temperature. Note that the method for deriving the target pack temperature is not limited to those examples and can employ any method.

Next, the controller 16 derives a dewpoint temperature by assuming that water condensation occurs when the current temperature of the air in the battery pack 12 becomes the outside air temperature (S31). In one example, the controller 16 sets an acquired current outside air temperature as the dewpoint temperature.

Then, the controller 16 derives a boundary absolute humidity that shows an absolute humidity at the boundary of occurrence of water condensation, based on the dewpoint temperature (S32). Herein, the absolute humidity is weight absolute humidity (g/kg).

Thereafter, the controller 16 derives a boundary relative humidity that shows relative humidity at a boundary of occurrence of water condensation, based on the boundary absolute humidity derived in step S32 and the target pack temperature set in step S30 (S33). That is, assuming that the air in the battery pack 12 is in the state of having the target pack temperature and the boundary relative humidity, water condensation starts to occur when the temperature of this air is lowered to the outside air temperature. In consideration of this, setting the target pack humidity to be lower than this boundary relative humidity enables preventing water condensation even when the temperature of the air in the battery pack 12 is lowered to the outside air temperature.

From this point of view, the controller 16 derives the target pack humidity based on the boundary relative humidity, which is derived in step S33 (S34). For example, the controller derives the target pack humidity by subtracting a predetermined value from the boundary relative humidity. The predetermined value may be a constant or may be a variable that is changed in accordance with the target pack temperature.

Figure 4:
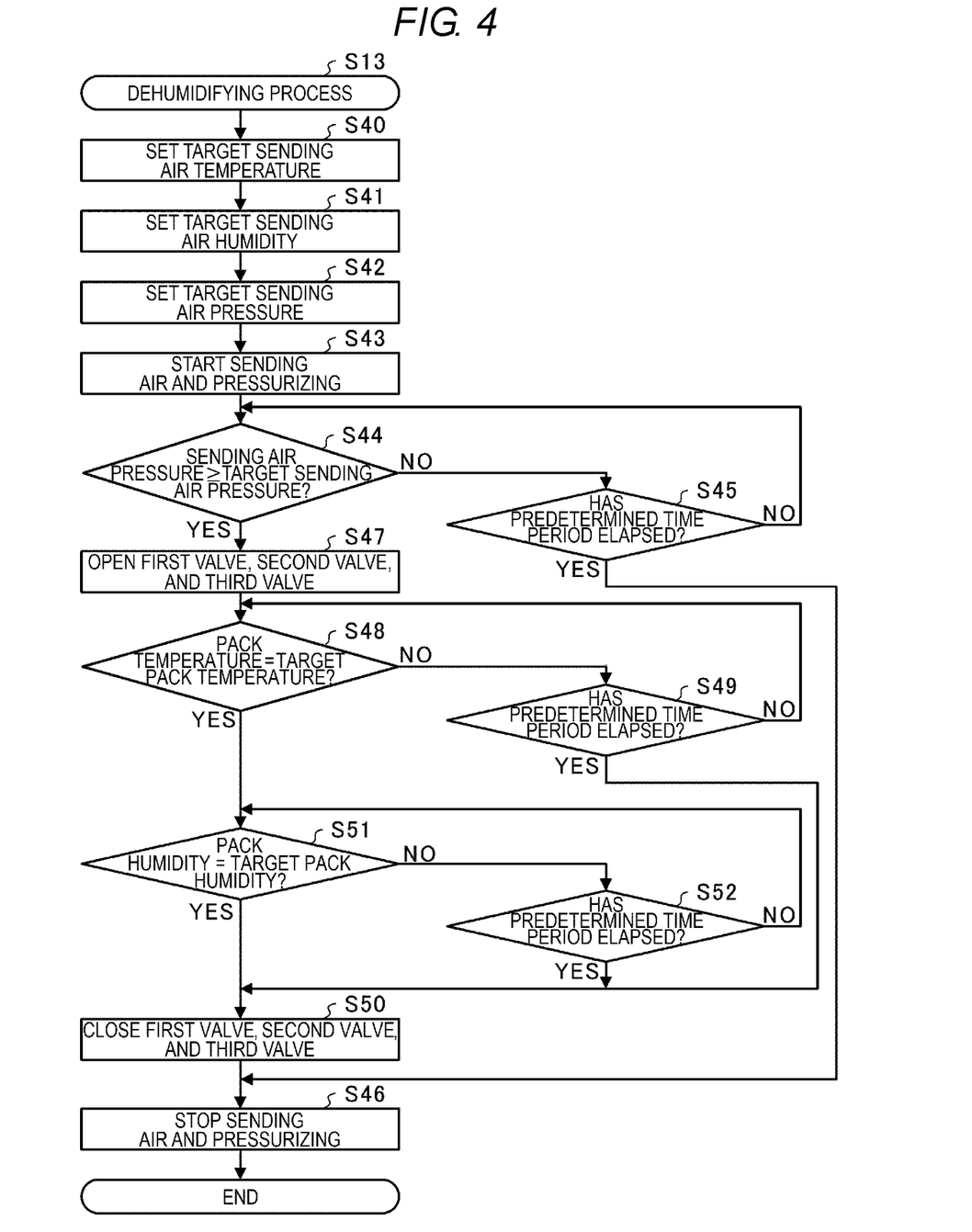
FIG. 4 is a flowchart of a dehumidifying process.

FIG. 4 is a flowchart of the dehumidifying process (S13). The first valve 26, the second valve 28, and the third valve 30 all are closed before the dehumidifying process is performed.

First, the controller 16 sets a target sending air temperature as a target value of the sending air temperature (S40). For example, the controller 16 sets the target pack temperature, which is set during derivation in the target pack-humidity deriving process (S11), as the target sending air temperature.

The controller 16 then sets a target sending air humidity as a target value of the sending air humidity (S41). For example, the controller 16 sets the target pack humidity, which is derived in the target pack-humidity deriving process (S11), as the target sending air humidity.

Next, the controller 16 sets a target sending air pressure as a target value of the sending air pressure (S42). For example, the controller 16 sets the target sending air pressure by adding a predetermined value to the outside air pressure. That is, the target sending air pressure is a value higher than the outside air pressure.

The controller 16 then starts the air conditioning system 14 sending air from the blowing port 44 and also starts the pressure regulator 22 pressurizing (S43). At this time, the controller 16 makes the air conditioning system 14 send air in which the temperature is set to the target sending air temperature and the humidity is set to the target sending air humidity. The controller 16 operates the pressure regulator 22 so that the sending air pressure will be the target sending air pressure.

Thereafter, the controller 16 determines whether the sending air pressure becomes equal to or higher than the target sending air pressure (S44). In the case in which the sending air pressure does not reach the target sending air pressure or higher (S44), the controller 16 determines whether a predetermined time period has elapsed from the time of starting pressurizing (S45). In the case in which the predetermined time period has not elapsed (NO in S45), the controller 16 returns to the process in step S44. In the case in which the predetermined time period elapses (YES in S45), the controller 16 times out and advances to the process in step S46. Subsequently, the controller 16 stops the air conditioning system 14 from sending air and also stops the pressure regulator from pressurizing (S46), to terminate the dehumidifying process.

In the case in which the sending air pressure reaches the target sending air pressure or higher (YES in S44), the controller 16 makes all of the first valve 26, the second valve 28, and the third valve 30 open (S47). In response to this, the air that is sent out from the pressure regulator 22 at a pressure higher than the outside air pressure, passes through the control chamber 24 and the battery pack 12 to the outside space. At this time, the air in the control chamber inside space 50 and the air in the pack inside space 32 are replaced with the air that is sent out from the pressure regulator 22. The air in the pack inside space 32 is replaced with the dry air that is sent from the air conditioning system 14, and therefore, the pack humidity approaches the target pack humidity.

After each of the valves is opened, the controller 16 determines whether the pack temperature becomes equal to the target pack temperature (S48).

In the case in which the pack temperature is not equal to the target pack temperature (NO in S48), the controller 16 determines whether a predetermined time period has elapsed from the time all of the first valve 26, the second valve 28, and the third valve 30 are opened (S49). In the case in which the predetermined time period has not elapsed (NO in S49), the controller 16 returns to the process in step S48. In the case in which the predetermined time period elapses (YES in S49), the controller 16 times out and advances to the process in step S50. Then, the controller 16 makes all of the first valve 26, the second valve 28, and the third valve 30 close (S50). Subsequently, the controller 16 stops the air conditioning system 14 from sending air and also stops the pressure regulator from pressurizing (S46), to terminate the dehumidifying process.

In the case in which the pack temperature is equal to the target pack temperature (YES in S48), the controller 16 determines whether the pack humidity becomes equal to the target pack humidity (S51).

In the case in which the pack humidity is not equal to the target pack humidity (NO in S51), the controller 16 determines whether a predetermined time period has elapsed from the time all of the first valve 26, the second valve 28, and the third valve 30 are opened (S52). The predetermined time period in step S52 may be equal to or longer than the predetermined time period in step S49. In the case in which the predetermined time period has not elapsed (NO in S52), the controller 16 returns to the process in step S51. In the case in which the predetermined time period elapses (YES in S52), the controller 16 times out and advances to the process in step S50.

In the case in which the pack humidity is equal to the target pack humidity (YES in S51), the controller 16 makes all of the first valve 26, the second valve 28, and the third valve 30 close at this time (S50). Thus, the pack humidity is maintained at the target pack humidity. Subsequently, the controller 16 stops the air conditioning system 14 from sending air and also stops the pressure regulator 22 from pressurizing (S46), to terminate the dehumidifying process.

Meanwhile, in the state in which the dehumidifying process is terminated due to the lapse of the predetermined time period in step S52, the pack humidity may not be equal to the target pack humidity. However, the pack humidity can be gradually made close to the target pack humidity by repeatedly executing the main processes in FIG. 4.

Figure 5:
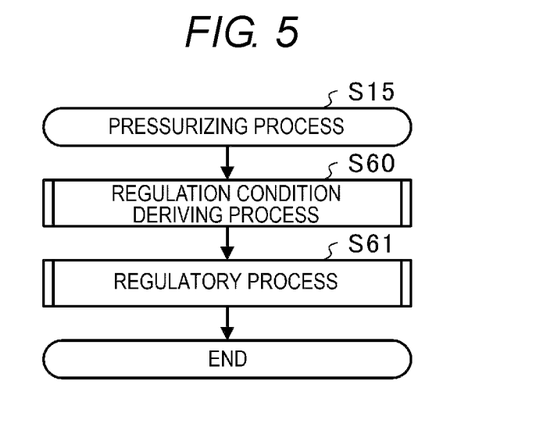
FIG. 5 is a flowchart of a pressurizing process.

FIG. 5 is a flowchart of the pressurizing process (S15). The pressurizing process will be overviewed. First, the controller 16 makes the state of the air in the control chamber inside space 50 to be regulated in the state in which the control chamber inside space 50 and the pack inside space 32 are partitioned and are not directly coupled to each other. Then, the controller 16 directly couples the control chamber inside space 50 and the pack inside space 32 to each other. In response to this, the state of the air in the control chamber inside space 50 and the state of the air in the pack inside space 32 are combined with each other. The controller 16 then partitions the control chamber inside space 50 and the pack inside space 32 from each other again, after the airs are sufficiently mixed with each other. This results in the air in the pack inside space 32 being in a desired state. The following describes details of the pressurizing process.

First, before regulation relating to the control chamber inside space 50 is executed, the controller 16 performs a regulation condition deriving process for deriving each regulation condition used in regulation (S60). Examples of the regulation condition include target values of the sending air temperature, the sending air humidity, and the sending air pressure. The regulation condition deriving process will be detailed later.

Next, the controller 16 performs a regulatory process for executing regulation in accordance with the derived regulation conditions (S61). In the regulatory process, the air is actually sent out from the air conditioning system 14, and the regulation is executed in the order described in the above overview. The regulatory process will be detailed later.

Figure 6:
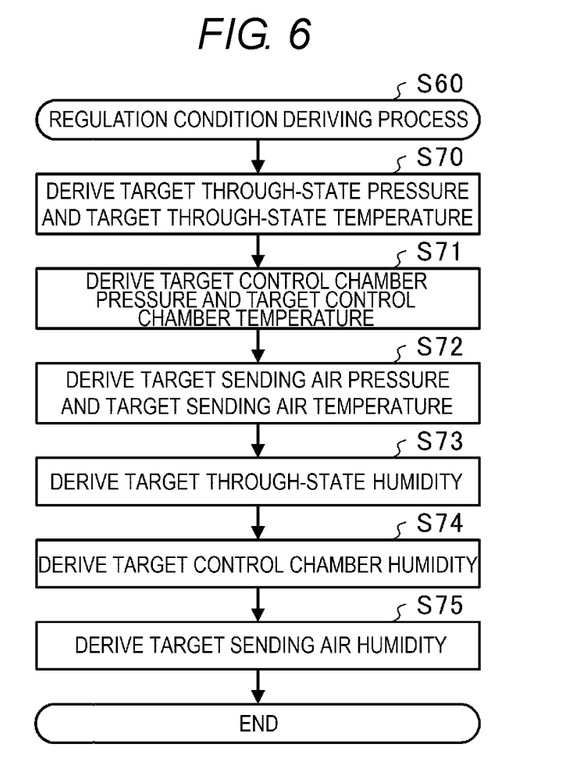
FIG. 6 is a flowchart of a regulation condition deriving process.

FIG. 6 is a flowchart of the regulation condition deriving process (S60). Hereinafter, the state in which the control chamber inside space 50 and the pack inside space 32 are directly coupled to each other, in other words, the state in which the first valve 26 is opened but the second valve 28 and the third valve 30 are closed, may be referred to as a "through state". In addition, temperature, humidity, and pressure of the air in the through state may be referred to as a "through-state temperature", a "through-state humidity", and a "through-state pressure", respectively.

First, the controller 16 derives a target through-state pressure as a target value of the through-state pressure and also derives a target through-state temperature as a target value of the through-state temperature (S70).

Herein, the final pack pressure is desired to be equal to the outside air pressure. That is, the target pack pressure as the target value of the pack pressure is equal to the outside air pressure. In addition, when the pack inside space 32 and the control chamber inside space 50 are made to be not directly coupled to each other from the through state, the pack pressure is not changed from the preceding through-state pressure. In view of this, the controller 16 sets the outside air pressure as the target through-state pressure.

Moreover, when the pack inside space 32 and the control chamber inside space 50 are made to be not directly coupled to each other from the through state, the pack temperature is not changed from the preceding through-state temperature. For this reason, the controller 16 sets the target pack temperature, which is set during derivation in the previous target pack-humidity deriving process (S11), as the target through-state temperature.

Next, the controller 16 derives a target control chamber pressure as a target value of the control chamber pressure and also derives a target control chamber temperature as a target value of the control chamber humidity (S71).

Herein, on the condition that a volume of the air in the communication member 20c is omitted, a volume Vi of the air in the space in the through state is the total of a volume VB of the air in the pack inside space 32 and a volume VD of the air in the control chamber inside space 50, as shown by the following formula (1).

$$Vi = VB + VD \tag{1}$$

It is assumed that the target through-state pressure is represented as "Pi", the target through-state temperature is represented as "Ti", the target control chamber pressure is represented as "PD2", and the target control chamber temperature is represented as "TD2". At the time the control chamber 24 is changed from the partitioned state to the through state, the Boyle-Charles law shown by the following formula (2) holds. The left side in the formula (2) shows the state of the air in the through state. The right side in the formula (2) shows the state of the air in the control chamber 24 in the partitioned state.

$$Pi \times Vi/Ti = PD2 \times VD/TD2 \tag{2}$$

The formula (2) is arranged by substituting the formula (1), whereby the following formula (3) is derived.

$$Pi/Ti \times (VB + VD)/VD = PD2/TD2 \tag{3}$$

In consideration that the outside air pressure is used for the target through-state pressure Pi, and the target pack temperature is used for the target through-state temperature, as described above, the left side of the formula (3) is a constant. Thus, the controller 16 simply derives the target control chamber pressure PD2 and the target control chamber temperature TD2 that satisfy the relationship in the formula (3).

The target control chamber pressure PD2, which is regulated by the sending air pressure, depends on the range of pressure that can be output by the pressure regulator 22. For this reason, the controller 16 determines a pressure that is freely selected within the pressure range of the pressure regulator 22, as the target control chamber pressure PD2. For example, in the state in which the outside air pressure is within the pressure range of the pressure regulator 22, the controller 16 sets the outside air pressure as the target control chamber pressure PD2. Otherwise, in the state in which the outside air pressure is without the pressure range of the pressure regulator 22, the controller 16 sets a pressure that is closest to the outside air pressure within the pressure range, as the target control chamber pressure PD2. The controller 16 then determines the target control chamber temperature TD2 based on the determined target control chamber pressure PD2 and the formula (3).

Next, the controller 16 derives the target sending air pressure as a target value of the sending air pressure and also derives the target sending air temperature as a target value of the sending air temperature (S72). For example, the controller 16 sets the target control chamber pressure PD2 as the target sending air pressure and sets the target control chamber temperature TD2 as the target sending air temperature.

The controller 16 may derive the target sending air temperature based on the target control chamber temperature TD2 and the current control chamber temperature. For example, in the state in which the target control chamber temperature TD2 is lower than the current control chamber temperature, the controller 16 may set the target sending air temperature to be lower than the target control chamber temperature TD2 so that the control chamber temperature will rapidly reach the target control chamber temperature TD2.

Then, the controller 16 derives a target through-state humidity as a target value of the through-state humidity (S73). When the pack inside space 32 and the control chamber inside space 50 are made to be not directly coupled to each other from the through state, the pack humidity is not changed from the preceding through-state humidity. For this reason, the controller 16 sets the target pack humidity, which is derived in the target pack-humidity deriving process (S11), as the target through-state humidity.

Thereafter, the controller 16 derives a target control chamber humidity as a target value of the control chamber humidity (S74).

The amount of water vapor in the air in the through state is equal to the total of the amount of water vapor in the air in the pack inside space 32 and the amount of water vapor in the air in the control chamber inside space 50 when the pack inside space 32 and the control chamber inside space 50 are not directly coupled to each other. For example, it is assumed that the volume of the air in the pack inside space 32 and the volume of the air in the control chamber inside space 50 are equal to each other. In these conditions, with respect to relationships between a target absolute humidity hi in the through state, a current absolute humidity hB in the pack inside space 32, and a target absolute humidity hD in the control chamber inside space 50, a relational formula is derived as shown by the following formula (4). The left side in the formula (4) is the total of the absolute humidity hi in the pack inside space 32 in the through state and the absolute humidity hi in the control chamber inside space 50 in the through state.

$$hi + hi = hB + hD \tag{4}$$

In view of them, the controller 16 derives the target absolute humidity hi in the through state, from the target through-state humidity and the target through-state temperature. The controller 16 also derives the current absolute humidity hB in the pack inside space 32, from the current pack humidity and the current pack temperature. Then, the controller 16 substitutes the target absolute humidity hi in the through state and the current absolute humidity hB in the pack inside space 32, for the formula (4), to derive the target absolute humidity hD in the control chamber inside space 50. The controller 16 then derives the target control chamber humidity from the target absolute humidity hD in the control chamber inside space 50 and the target control chamber temperature.

Next, the controller 16 derives the target sending air humidity as a target value of the sending air humidity (S75) and terminates the regulation condition deriving process. For example, the controller 16 sets the target control chamber humidity as the target sending air humidity.

The controller 16 may derive the target sending air humidity based on the target control chamber humidity and the current control chamber humidity. For example, in the state in which the target control chamber humidity is lower than the current control chamber humidity, the controller 16 may set the target sending air humidity to be lower than the target control chamber humidity so that the control chamber humidity will rapidly reach the target control chamber humidity.

Figure 7:
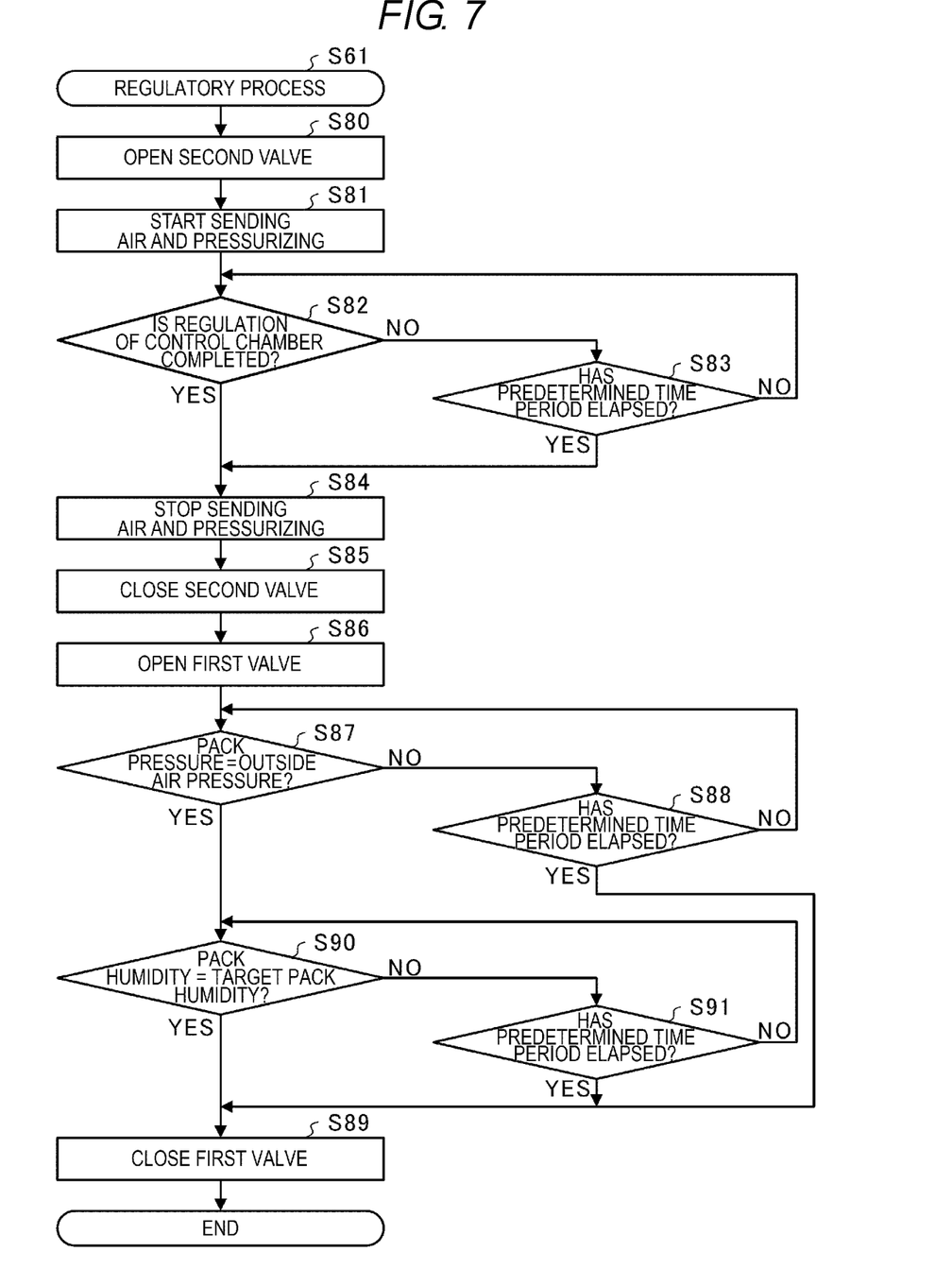
FIG. 7 is a flowchart of a regulatory process.

FIG. 7 is a flowchart of the regulatory process (S61). The first valve 26, the second valve 28, and the third valve 30 all are closed before the regulatory process is performed.

First, the controller 16 makes the second valve 28 open (S80). Then, the controller 16 starts the air conditioning system 14 sending air from the blowing port 44 and also starts the pressure regulator 22 pressurizing (S81). At this time, the controller 16 makes the air conditioning system 14 send air in which the temperature and the humidity are respectively set to the target sending air temperature and the target sending air humidity that are determined in the regulation condition deriving process. The controller 16 operates the pressure regulator 22 so that the sending air pressure will be the target sending air pressure that is determined in the regulation condition deriving process. In the state in which the second valve 28 is opened whereas the first valve 26 is closed, the state of the air in the control chamber 24 is regulated by the air that passes through the pressure regulator 22.

Then, the controller 16 determines whether the regulation of the state of the air in the control chamber 24 is completed (S82). For example, when the control chamber temperature becomes equal to the target control chamber temperature, the control chamber humidity becomes equal to the target control chamber humidity, and the control chamber pressure becomes equal to the target control chamber pressure, the controller 16 determines that the regulation relating to the control chamber 24 is completed. Note that regulation relating the control chamber 24 may be determined to be completed when at least one of the temperature, the humidity, or the pressure becomes equal to the target value, instead of when all of the temperature, the humidity, and the pressure become equal to the target values.

In the case in which the regulation relating to the control chamber 24 is completed (YES in S82), the controller 16 advances to the process in step S84. In the case in which the regulation relating to the control chamber 24 is not completed (NO in S82), the controller 16 determines whether a predetermined time period has elapsed after the air conditioning system 14 starts sending air (S83). In the case in which the predetermined time period has not elapsed (NO in S83), the controller 16 returns to the process in step S82. In the case in which the predetermined time period elapses (YES in S83), the controller 16 times out and advances to the process in step S84.

In step S84, the controller 16 stops the air conditioning system 14 from sending air and also stops the pressure regulator 22 from pressurizing (S84). The controller 16 then makes the second valve 28 close (S85).

Next, the controller 16 changes the first valve 26 from the closed state to the opened state (S86). This causes the control chamber inside space 50 and the pack inside space 32 to be in the through state, whereby the air in the control chamber 24 and the air in the battery pack 12 are mixed together.

After the through state is obtained, the controller 16 determines whether the pack pressure becomes equal to the outside air pressure (S87). In the case in which the pack pressure is not equal to the outside air pressure (NO in S87), the controller 16 determines whether a predetermined time period has elapsed from the time the first valve 26 is opened (S88). In the case in which the predetermined time period has not elapsed (NO in S88), the controller 16 returns to the process in step S87. In the case in which the predetermined time period elapses (YES in S88), the controller 16 times out and makes the first valve 26 close (S89), to terminate the regulatory process.

In the case in which the pack pressure is equal to the outside air pressure (YES in S87), the controller 16 determines whether the pack humidity becomes equal to the target pack humidity (S90). In the case in which the pack humidity is equal to the target pack humidity (YES in S90), the controller makes the first valve 26 close at this time (S89) to terminate the regulatory process.

In the case in which the pack humidity is not equal to the target pack humidity (NO in S90), the controller 16 determines whether a predetermined time period has elapsed from the time the first valve 26 is opened (S91). The predetermined time period in step S91 may be equal to or longer than the predetermined time period in step S88. In the case in which the predetermined time period has not elapsed (NO in S91), the controller 16 returns to the process in step S90. In the case in which the predetermined time period elapses (YES in S91), the controller 16 times out and makes the first valve 26 close (S89), to terminate the regulatory process.

In the state in which the regulatory process is terminated due to the lapse of the predetermined time period in step S88, the pack pressure may not be equal to the outside air pressure. In addition, in the state in which the regulatory process is terminated due to the lapse of the predetermined time period in step S91, the pack humidity may not be equal to the target pack humidity. However, the pack pressure can be gradually made close to the outside air pressure, and the pack humidity can also be gradually made close to the target pack humidity, by repeatedly executing the main processes in FIG. 7.

Figure 8:
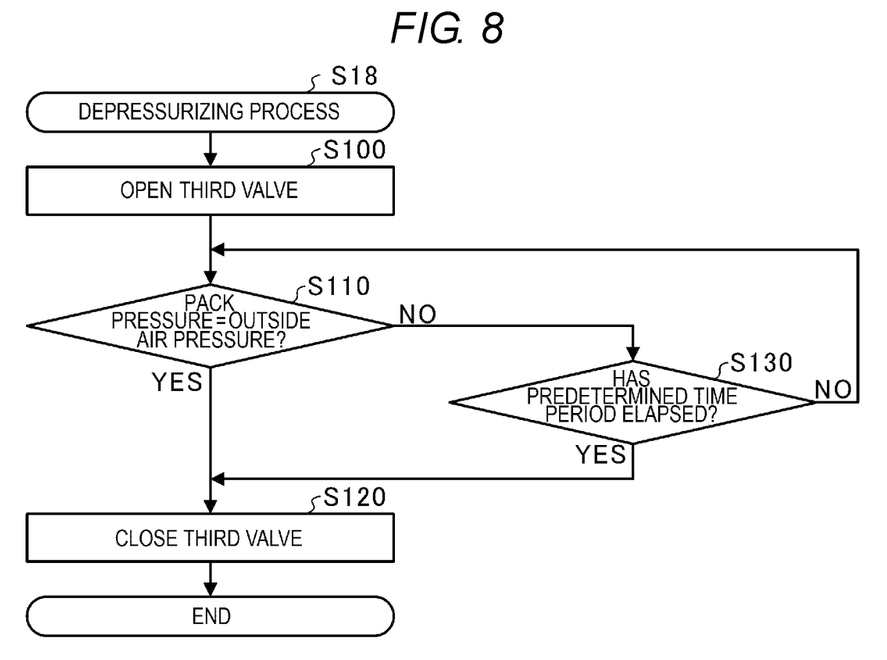
FIG. 8 is a flowchart of a depressurizing process.

FIG. 8 is a flowchart of the depressurizing process (S18). The first valve 26, the second valve 28, and the third valve 30 all are closed before the depressurizing process is performed. In addition, the pack pressure is higher than the outside air pressure before the depressurizing process is performed.

First, the controller 16 makes the third valve 30 open (S100). In response to this, some of the air in the battery pack 12 moves to the outside space having a pressure lower than that in the battery pack 12, via the outlet 52. As a result, the pack pressure is naturally reduced and approaches the outside air pressure.

The controller 16 determines whether the pack pressure becomes equal to the outside air pressure (S110). In the case in which the pack pressure is equal to the outside air pressure (YES in S110), the controller 16 makes the third valve 30 close at this time (S120) to terminate the depressurizing process.

In the case in which the pack pressure is not equal to the outside air pressure (NO in S110), the controller 16 determines whether a predetermined time period has elapsed from the time the third valve 30 is opened (S130). In the case in which the predetermined time period has not elapsed (NO in S130), the controller 16 returns to the process in step S110. In the case in which the predetermined time period elapses (YES in S130), the controller 16 times out and makes the third valve 30 close (S120), to terminate the depressurizing process.

Figure 9:
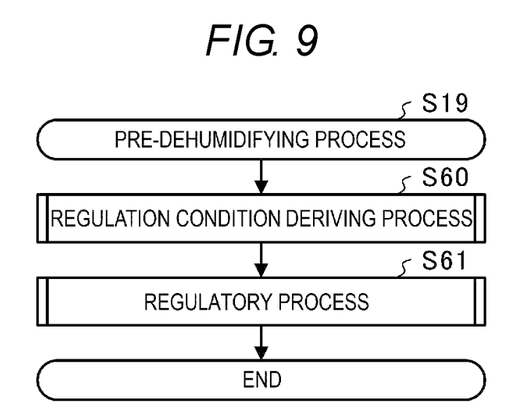
FIG. 9 is a flowchart of a pre-dehumidifying process.

FIG. 9 is a flowchart of the pre-dehumidifying process (S19). The pre-dehumidifying process (S19) is performed basically in the procedure similar to that in the pressurizing process (S15). That is, the controller 16 performs the regulation condition deriving process (S60) and then performs the regulatory process (S61) in the pre-dehumidifying process. For this reason, in order to avoid duplication, a detailed description is omitted. Note that the pre-dehumidifying process may differ from the pressurizing process in a specific value of each kind of the regulation conditions derived in the regulation condition deriving process.

Figure 10:
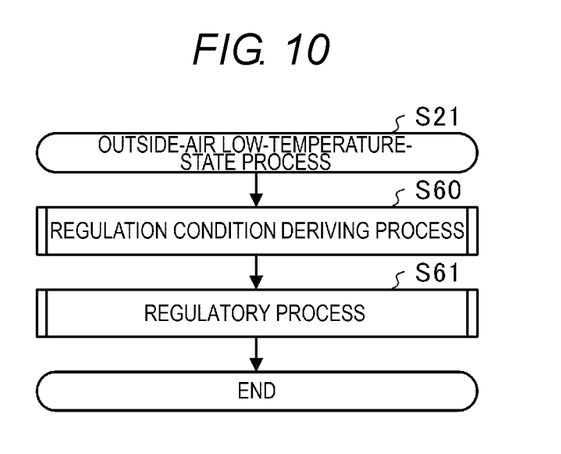
FIG. 10 is a flowchart of an outside-air low-temperature-state process.

FIG. 10 is a flowchart of the outside-air low-temperature-state process (S21). The outside-air low-temperature-state process (S21) is performed basically in the procedure similar to that in the pressurizing process (S15). That is, the controller 16 performs the regulation condition deriving process (S60) and then performs the regulatory process (S61), in the outside-air low-temperature-state process. For this reason, in order to avoid duplication, a detailed description is omitted. Note that the outside-air low-temperature-state process may differ from the pressurizing process in a specific value of each kind of the regulation conditions derived in the regulation condition deriving process.

As described above, the controller 16 of the vehicle 1 according to this embodiment controls the air conditioning system 14 so that the humidity in the battery pack 12 will be equal to or lower than the outside air humidity. Thus, in the vehicle 1 of this embodiment, the humidity, which is an example of the state of the air, in the battery pack 12 is regulated. As a result, in the vehicle 1 of this embodiment, it is possible to prevent water condensation in the battery pack 12, thereby suppressing acceleration of damage and deterioration of the battery module 10 and the battery pack 12.

The controller 16 of the vehicle 1 according to this embodiment controls the air conditioning system 14 and the pressure regulator 22 so that the pressure in the battery pack 12 will be equal to the outside air pressure. Thus, in the vehicle 1 of this embodiment, the pressure, which is an example of the state of the air, in the battery pack 12 is regulated. As a result, in the vehicle 1 of this embodiment, it is possible to suppress acceleration of damage and deterioration of, for example, a seal member of the battery pack 12, whereby the battery module 10 and the battery pack 12 can be used for a long time.

In the vehicle 1 according to this embodiment, the control chamber 24 is provided at the intermediate part of the air ventilation passage through the communication members 20. A member that can interfere with flow of the air, such as the battery module 10, is not disposed in the control chamber 24. With this structure, in the vehicle 1 of this embodiment, the state of the air in the control chamber 24 can be accurately regulated to an appropriate state. In the vehicle 1 of this embodiment, the state of the air in the control chamber 24 is reflected to the state of the air in the battery pack 12, and thus, it is possible to accurately regulate the state of the air in the battery pack 12.

In addition, even if gas is generated from the battery module 10, the control chamber 24, which is provided to the vehicle 1 of this embodiment, encloses the generated gas and prevents the generated gas from leaking to the outside space.

Figure 11:
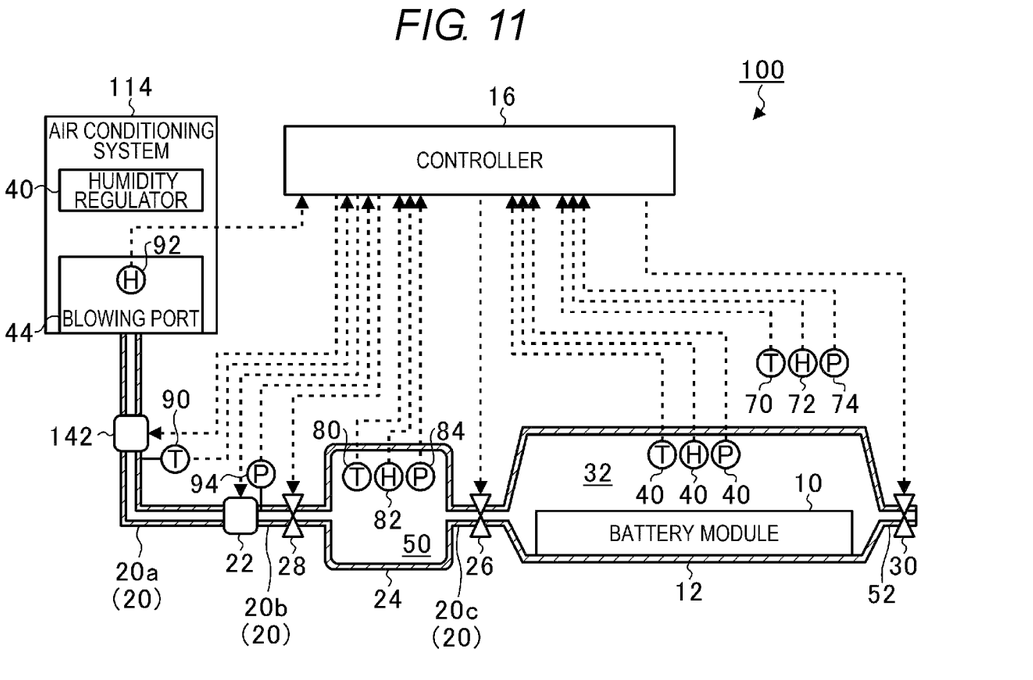
FIG. 11 is a schematic diagram illustrating a configuration of a vehicle according to a modification.

FIG. 11 is a schematic diagram illustrating a configuration of a vehicle 100 according to a modification. The vehicle 100 includes an air conditioning system 114, instead of the air conditioning system 14. The air conditioning system 114 differs from the air conditioning system 14 in that the temperature regulator 42 and the sending air temperature detector 90 are omitted.

The air conditioning system 114 is, for example, a chiller. The humidity regulator 40 of the air conditioning system 114 decreases temperature of the intake air to be lower than the dewpoint temperature so as to forcibly reduce the amount of water vapor in the air, whereby air having a desired humidity is generated. Thus, the air that is sent out from the blowing port 44 of the air conditioning system 114 has a temperature lower than a desired temperature.

In the vehicle 100, a temperature regulator 142 is provided at the communication member 20a. The temperature regulator 142 is, for example, a heater. The temperature regulator 142 heats the air that is sent out from the blowing port 44, to make the air having a desired sending air temperature. The sending air temperature detector 90 is provided between the temperature regulator 142 and the pressure regulator 22 at the communication member 20a. The sending air temperature detector 90 detects temperature of the air that is heated by the temperature regulator 142, that is, the sending air temperature.

The controller 16 of the vehicle 100 controls the air conditioning system 114 so that the humidity in the battery pack 12 will be equal to or lower than the outside air humidity, in a manner similar to that in the vehicle 1 of the above embodiment. Thus, as in the case of the vehicle 1, in the vehicle 100, the humidity, which is an example of the state of the air, in the battery pack 12 is regulated.

The controller 16 of the vehicle 100 controls the air conditioning system 114 and the pressure regulator 22 so that the pressure in the battery pack 12 will be equal to the outside air pressure, in a manner similar to that in the vehicle 1 of the above embodiment. Thus, as in the case of the vehicle 1, in the vehicle 100, the pressure, which is an example of the state of the air, in the battery pack 12 is regulated.

The embodiment of the disclosure has been described above with reference to the accompanying drawings. It is needless to say that the disclosure is not limited to such an embodiment. It will be apparent to those skilled in the art that various changes and modifications may be conceived within the scope of the claims, and it is understood that such changes and modifications also fall within the technical scope of the disclosure.

For example, in the above embodiment and the modification, the pack humidity is made to be equal to or lower than the outside air humidity, as well as the pack pressure is made to be equal to the outside air pressure. However, the controller 16 may perform the control for making the pack humidity be equal to or lower than the outside air humidity and may omit the control for making the pack pressure be equal to the outside air pressure. Conversely, the controller 16 may perform control for making the pack pressure be equal to the outside air pressure and may omit the control for making the pack humidity be equal to or lower than the outside air humidity.

In the above embodiment and the modification, the control chamber 24 is provided. However, the control chamber 24 may be omitted. In this case, the controller 16 may directly regulate the state of the air in the battery pack 12. Note that the embodiment using the control chamber 24 can more accurately regulate the state of the air in the battery pack 12, as described above.

The disclosure enables regulating the state of the air in the battery pack.

The invention claimed is:
1. A vehicle comprising:
a battery pack containing a housing module;
an air conditioning system configured to send air;
a communication member that fluidly connects a blowing port of the air conditioning system and an inside of the battery pack;
a pressure regulator provided in an air ventilation passage defined by the communication member, the pressure regulator being configured to change pressure of air that passes through the communication member;
an outlet that fluidly connects an inside space of the battery pack and an outside space;
a control chamber disposed at an intermediate part of an air ventilation passage through the communication member, the control chamber having a space that has an air ventilation cross sectional area larger than an air ventilation cross sectional area of the communication member;
a first valve provided to a portion of the communication member that fluidly connects the control chamber and the battery pack;

a second valve provided to a portion of the communication member that fluidly connects the pressure regulator and the control chamber;
a third valve provided to the outlet;
a pack pressure detector configured to detect pressure in the battery pack;
a control chamber pressure detector configured to detect pressure in the control chamber;
an outside air pressure detector configured to detect pressure of outside air; and
a controller configured to control the air conditioning system, the pressure regulator, the first valve, the second valve and the third valve based on the detected pressure in the battery pack, the detected pressure in the control chamber and the detected pressure of the outside air such that the pressure in the battery pack is equal to the pressure of the outside air.

2. The vehicle according to claim 1 further comprising:
a pack humidity detector configured to detect humidity in the inside of the battery pack; and
an outside air humidity detector configured to detect humidity of the outside air,
wherein the controller is configured to:
  perform an initializing process in which the controller i) closes the first valve, the second valve and the third valve, ii) stops the air conditioning system from sending the air and iii) stops the pressure regulator changing the pressure of the air when the detected pressure in the battery pack is substantially equal to the detected pressure of the outside air;
  perform a pressurizing process to increase the pressure in the battery pack while keeping the third valve closed when the detected pressure in the battery pack is lower than the detected pressure of the outside air;
  perform a depressurizing process to decrease the pressure in the battery pack by opening the third valve when the detected pressure in the battery pack is higher than the detected pressure of the outside air and when the detected humidity in the inside of the battery pack is equal to or lower than a predetermined value that is equal to or lower than the detected humidity of the outside air; and
  perform the pressurizing process when the detected pressure in the battery pack is higher than the detected pressure of the outside air and when the detected humidity in the inside of the battery pack is higher than the predetermined value.

3. The vehicle according to claim 2, wherein the pressurizing process comprises:
a first process in which the controller i) opens the second valve, ii) closes the first valve and the third valve, iii) starts the air conditioning system sending the air and iv) starts the pressure regulator changing the pressure of the air;
a second process, to be performed by the controller after the first process, in which the controller i) closes the second valve, ii) stops the air conditioning system from sending the air and iii) stops the pressure regulator from changing the pressure of the air; and
a third process, to be performed by the controller after the second process, in which the controller closes the first valve.

4. The vehicle according to claim 3, wherein the controller is configured to set the predetermined value lower than a humidity at which water vapor in an air in the battery pack does not condense even if a temperature of the air in the battery pack equals a temperature of the outside air.

5. The vehicle according to claim 4, wherein a volume of an inside space of the control chamber is substantially equal to a volume of a space for containing an air in the battery pack.

6. The vehicle according to claim 1 further comprising:
a pack humidity detector configured to detect humidity in the inside of the battery pack; and
an outside air humidity detector configured to detect humidity of the outside air,
wherein the controller is configured to:
  perform an initializing process in which the controller i) closes the first valve, the second valve and the third valve, ii) stops the air conditioning system from sending the air, and iii) stops the pressure regulator changing the pressure of the air when the detected humidity in the inside of the battery pack is equal to or lower than the detected humidity of the outside air and when the detected pressure in the battery pack is substantially equal to the detected pressure of the outside air;
  perform a dehumidifying process in which the controller i) opens the first valve, the second valve and the third valve, ii) starts the air conditioning system sending the air, and iii) starts the pressure regulator changing the pressure of the air when the detected humidity in the inside of the battery pack is higher than the detected humidity of the outside air;
  perform a pressurizing process to increase the pressure in the battery pack while keeping the third valve closed when the detected humidity in the inside of the battery pack is equal to or lower than the detected humidity of the outside air and when the detected pressure in the battery pack is lower than the detected pressure of the outside air;
  perform a depressurizing process to decrease the pressure in the battery pack by opening the third valve when the detected humidity in the inside of the battery pack is equal to or lower than a predetermined value that is equal to or lower than the detected humidity of the outside air and when the detected pressure in the battery pack is higher than the detected pressure of the outside air; and
  perform the pressurizing process to increase the pressure in the battery pack while keeping the third valve closed when the detected humidity in the inside of the battery pack is higher than the predetermined value and when the detected pressure in the battery pack is higher than the detected pressure of the outside air.

7. The vehicle according to claim 6, wherein
the pressurizing process comprises:
a first process in which the controller i) opens the second valve, ii) closes the first valve and the third valve, iii) starts the air conditioning system sending the air and iv) starts the pressure regulator changing the pressure of the air send from the air conditioning system;
a second process, to be performed by the controller after the first process, in which the controller i) closes the second valve, ii) stops the air conditioning system from sending the air and iii) stops the pressure regulator from changing the pressure of the air send from the air conditioning system; and
a third process, to be performed by the controller after the second process, in which the controller closes the first valve.

8. The vehicle according to claim 7, wherein the controller is configured to set the predetermined value lower than a value at which water vapor in an air in the battery pack does not condense even if a temperature of the air in the battery pack equals a temperature of the outside air.

9. The vehicle according to claim 8, wherein a volume of an inside space of the control chamber is substantially equal to a volume of a space for containing an air in the battery pack.

\* \* \* \* \*